Figure 1:
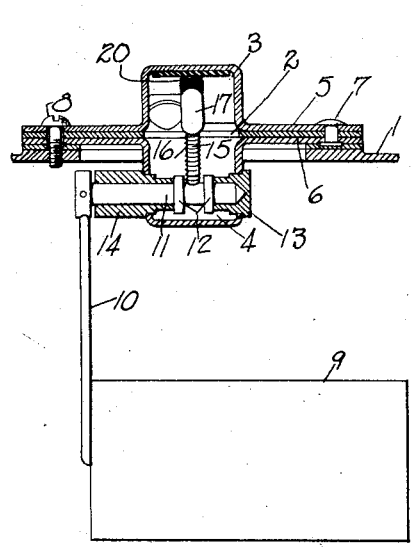

June 16, 1931.     M. E. CHENEY     1,810,818

OIL LEVEL GAUGE

Original Filed Dec. 18, 1928

Inventor
Moses C. Cheney
By Attorneys
Nathan & Bowman

Patented June 16, 1931

1,810,818

UNITED STATES PATENT OFFICE

MOSES E. CHENEY, OF FLUSHING, NEW YORK, ASSIGNOR TO MOTO METER GAUGE & EQUIPMENT CORPORATION, OF LONG ISLAND CITY, NEW YORK, A CORPORATION OF DELAWARE

OIL LEVEL GAUGE

Original application filed December 18, 1928, Serial No. 326,775. Divided and this application filed April 8, 1930. Serial No. 442,547.

This invention relates to an improvement in gearless tank fittings especially adapted for electric liquid level gauges of the type commonly used on commercial motor cars and is a division of the application Serial No. 326,775 filed December 18, 1928, which has since issued as Patent No. 1,796,000, March 10, 1931.

One object is to devise a simple unitary structure comprising a float arm and rheostat chamber that can be readily assembled on a tank and disassembled therefrom, dispensing with gear connections and having the rheostat chamber outside the tank while the part containing the connections for the float arm is within the tank, the two parts being readily connected together into one unitary device capable of being readily attached to the tank. It is also adapted for use with all different shapes and sizes of tanks. This unitary device is formed from a stamping and especially adapted to be used with gasoline tanks of various sizes and shapes in common use on motor cars. For that reason the upper and lower parts of the rheostat member are stamped out of metal with flat projecting portions and when these are secured together there is formed an insertable fitting having a completely enclosed central chamber with a single opening through one of the solid side walls of the lower part of the chamber for the float arm shaft and a single opening in the solid upper wall of the upper part of the chamber for the terminal for the electric circuit, the resistor being of arc shape and positioned on the inside of the arc shaped wall of the upper portion of said chamber. In this way there is formed a compact insertable rheostat-float arm fitting of the gearless type for a tank which is readily assembled on the tank. By reason of the relative positioning of the axial shaft chamber for the float arm within the tank, the necessary movement of the float arm is permitted, the arm having an arc of movement such as to bring the float arm into parallelism with the top of the tank without interference from the edges of walls of the tank that would otherwise occur, if the axial shaft was on the outside of the tank. The device will work equally well with long shallow tanks or deep narrow tanks. Moreover, the resistor chamber being positioned on the outside of the tanks insures a minimum of danger from explosion when applied to a gasoline tank.

The flat marginal portions projecting from the separate units, comprising the rheostat chamber, are first secured together by means of securing devices and then this unitary device is secured to the tank by securing devices that also pass through said flanges so that there are two sets of securing devices for this fitting.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction has been annexed as a part of this disclosure and, in such drawings, like characters of reference denote corresponding parts throughout all the views, of which:—

Figure 2:
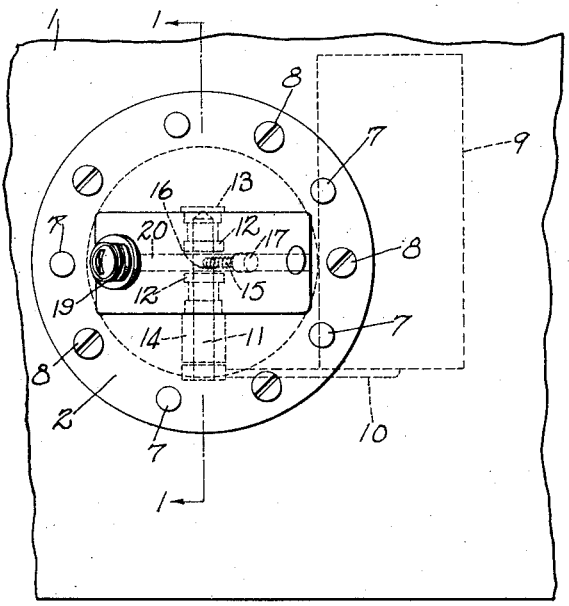
Figure 3:
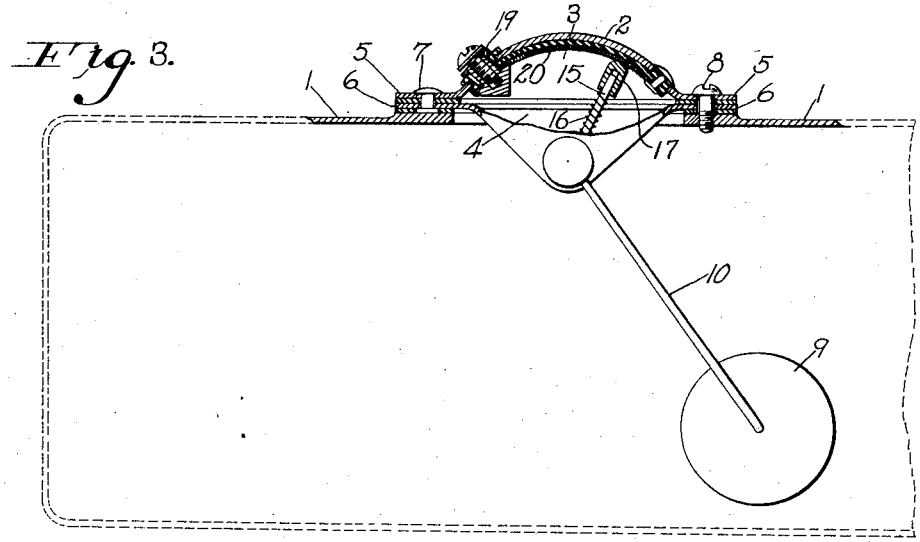

In the drawings Figure 1 is a sectional view on the line 1—1 of Fig. 2; Fig. 2 is a plan view and Fig. 3 is a side elevational view, parts being shown in section.

Referring to Fig. 1 the top wall of the tanks is indicated by 1, the rheostat tank fitting marked 2 being secured to the top wall of said tank.

The tank fitting comprises two separate units, the upper half comprising one unit and the lower half a separate unit. These two units are formed as indicated in Fig. 1 by stamping out of a piece of metal a central chamber with marginal projections around said chamber. The chambers are marked 3 and 4 and the projecting flange 5 and 6. The central portion marked 3 is the resistor chamber and the central portion 4 is the chamber for the connecting shaft of the float arm. The rivets 7 secure the two flanges together and the screws 8 secure the structure to the tank.

The float 9 is secured to the bent arm of the rod 10 and the upper end of said rod is connected to the axial member 11 which projects within the lower chamber 4 and is journaled in the side walls of said chamber. The axial member 11 and the rod 10 are shown connected together, but in said co-pending application Serial No. 326,775 an axial member is the bent end of the rod 10. This member 11 has an outer and inner flange 12, and the bushings 13 and 14 cooperating with said flanges form thrust bearings for said axis. The member 11 may first be inserted within said chamber 4, the washers 12 then placed on said shaft and the wiper arm 15 then be driven into place or otherwise secured to it, spring 16 and contact button 17 thereupon anchoring the shaft in place. The terminal 19 is arranged to anchor the resistor 20 in place.

It will now be apparent that this fitting is peculiarly well adapted for use with all kinds and shapes of gasoline tanks wherein the float arm operates an oscillating wiper arm which travels over a resistor that is connected to an electric circuit. For one thing, the two units when connected together form a solid casting having a substantially imperforated chamber for the resistor which is positioned outside of the tank while an opposing lower chamber has merely its side walls perforated for the axial member which forms the journal for the wiper arm. Another feature is that the chamber for the axial member of the fitting is positioned within the tank itself and by combining this with the horizontal shaft 11 it is only necessary to have an axial opening in the walls of the chamber in which the shaft can pivot thereby dispensing with any slotted opening and also dispensing with gear connections. The chamber 4 projects sufficiently far within the tank to insure that the float arm will have the necessary unobstructed movement when positioned in a shallow or deep tank, and at the same time the parts are arranged into a compact unitary fitting that can readily be assembled on a gasoline tank in a way to lessen the danger of explosion or fire.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of United States:—

1. A float operated rheostat comprising a casing composed of upper and lower stampings having flat marginal portions secured together and having upwardly and downwardly pressed central portions forming a chamber, an arcuate resistance coil mounted in the upwardly pressed portion of the upper stamping, a shaft journaled in the downwardly pressed portion of the lower stamping, and substantially coaxial with said coil, a contact arm within the chamber fixed to the shaft and engaging said arcuate resistance coil, and a float arm fixed to said shaft exteriorly of the casing.

2. A float operated rheostat comprising a casing having an upwardly arcuated top wall and a bottom wall having a central depression, a resistance element of arcuate form secured to the interior of the top wall, a transverse shaft substantially coaxial with the arcuate resistance element journaled in the depression of the bottom wall and extending through a side wall of the depression, a contact arm fixed to said shaft and engaging said resistance element, and a float arm fixed to said shaft exteriorly of the casing.

In witness whereof, I have hereunto subscribed my name.

MOSES E. CHENEY.